(12) United States Patent
Kumaran et al.

(10) Patent No.: US 7,050,668 B2
(45) Date of Patent: May 23, 2006

(54) METHODS AND APPARATUS FOR CONTROL OF OPTICAL SWITCHING ARRAYS THAT MINIMIZE BRIGHT STATE SWITCHING

(75) Inventors: Krishnan Kumaran, Scotch Plains, NJ (US); Nachi K. Nithi, Wayne, NJ (US); Carl Jeremy Nuzman, Union, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 189 days.

(21) Appl. No.: 10/464,929

(22) Filed: Jun. 19, 2003

(65) Prior Publication Data

US 2004/0258406 A1 Dec. 23, 2004

(51) Int. Cl.
*G02B 6/26* (2006.01)
*G02B 6/42* (2006.01)

(52) U.S. Cl. ...................................................... 385/17
(58) Field of Classification Search ................ 385/158, 385/24
See application file for complete search history.

(56) References Cited

U.S. PATENT DOCUMENTS 5,623,541 A * 4/1997 Boyle et al. ............ 379/221.15
5,844,540 A * 12/1998 Terasaki ..................... 345/102
5,896,474 A * 4/1999 Van Deventer et al. ....... 385/24
6,324,510 B1* 11/2001 Waibel et al. ........... 704/256.7
2002/0031124 A1* 3/2002 Li ............................... 370/390
2002/0051447 A1* 5/2002 Li ............................... 370/389
2005/0084264 A1* 4/2005 Kumaran et al. ............. 398/45

* cited by examiner

*Primary Examiner*—Frank G. Font
*Assistant Examiner*—T L. Rude

(57) ABSTRACT

Techniques and systems for control of optical switching arrays are described. A switch array controller according to an aspect of the present invention operates so as to achieve reduced power consumption and maintain crosstalk within acceptable limits. Various rules are applied in order to insure that the desired criteria are met. In order to reduce transient effects, switching from one output to another is accomplished in a sequence chosen to maximize the number of transitions occurring in those portions of the array not carrying a signal, and to minimize the number of transitions that occur in portions of the array carrying the signal. Transitions are made in the portion of the array to which the signal will be directed, then a switch is transitioned between the old and new signal paths, and finally further transitions are made in the portion of the array within which the signal was previously directed.

11 Claims, 13 Drawing Sheets

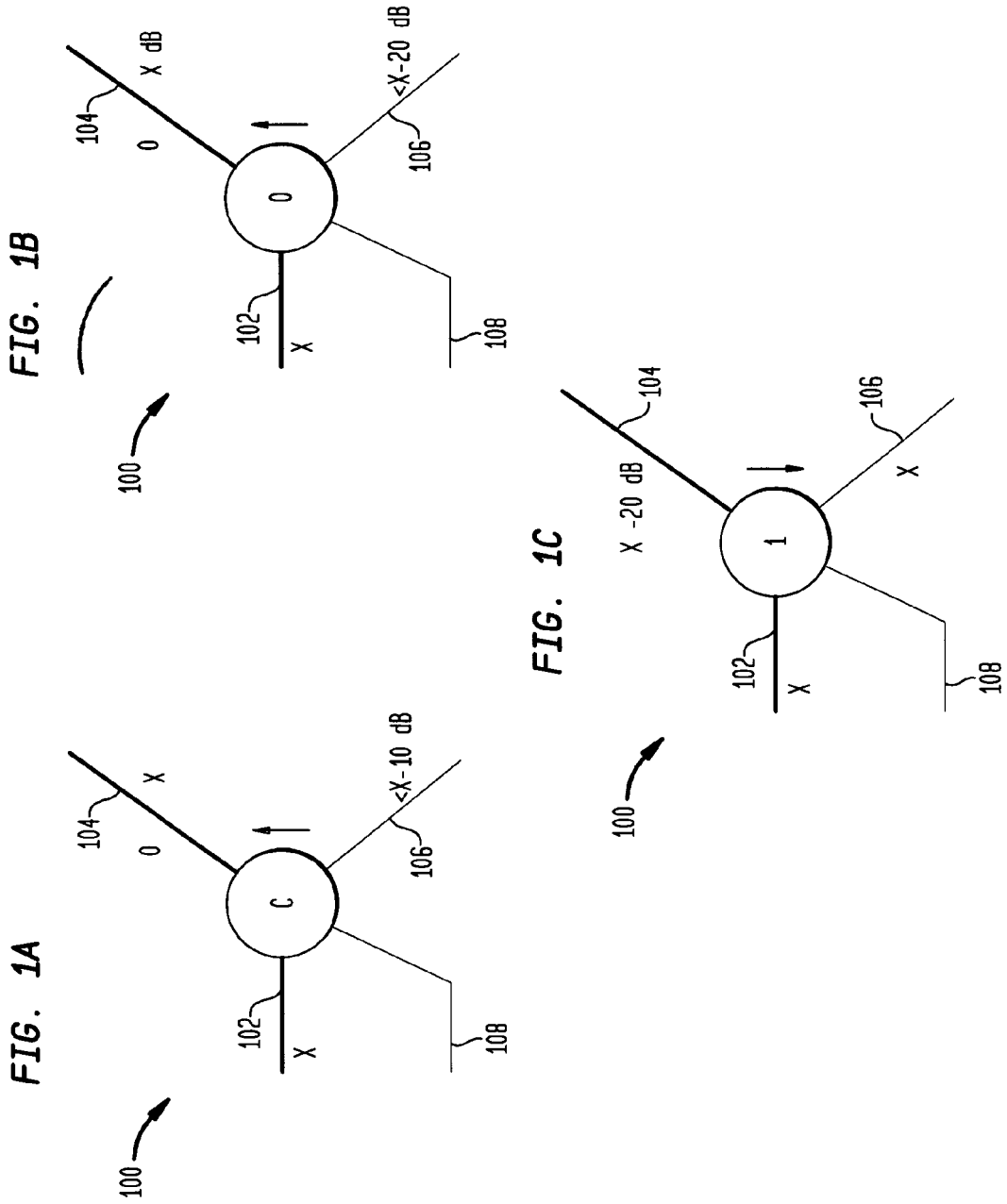

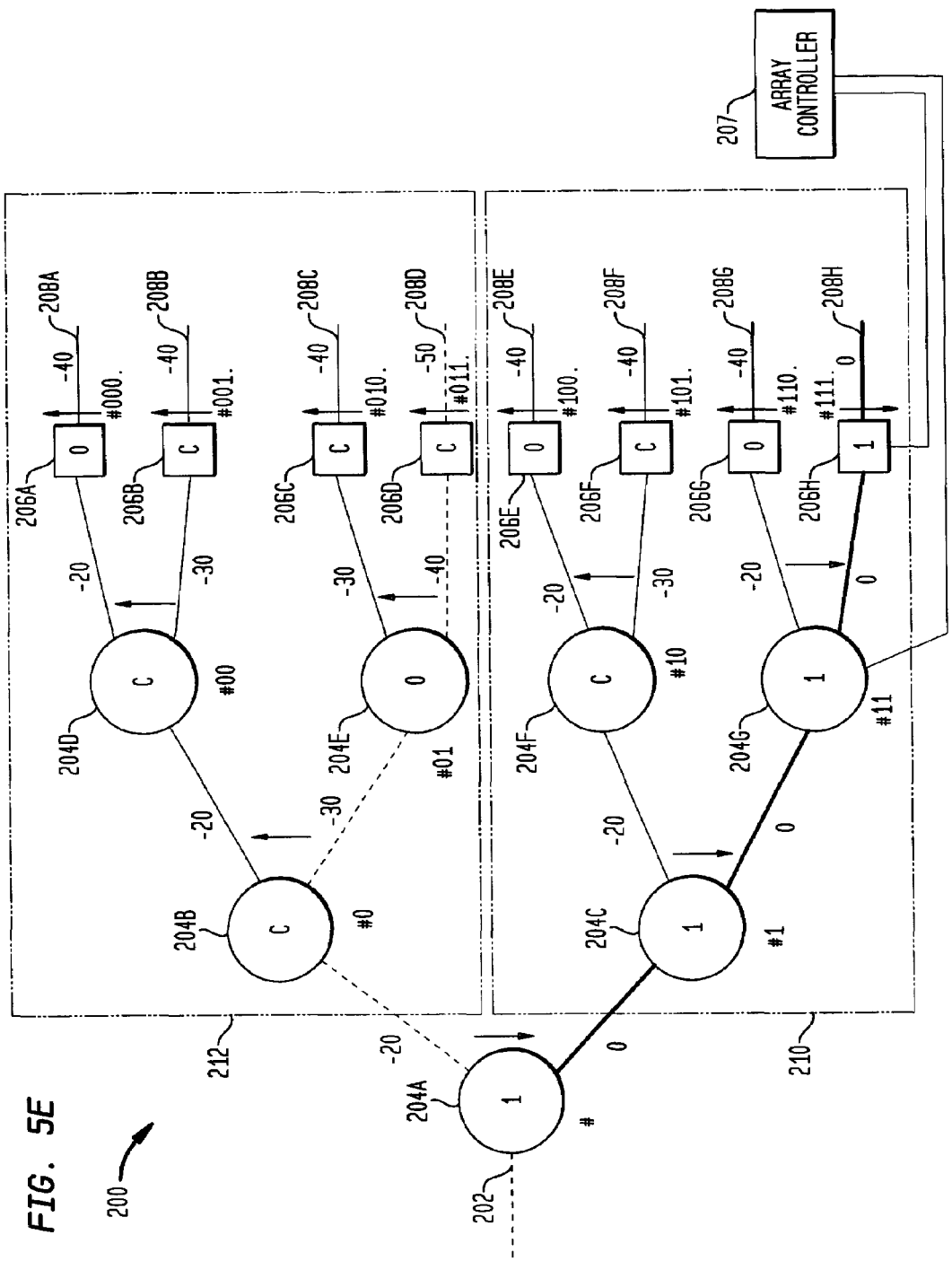

METHODS AND APPARATUS FOR CONTROL OF OPTICAL SWITCHING ARRAYS THAT MINIMIZE BRIGHT STATE SWITCHING

FIELD OF THE INVENTION

The present invention relates generally to improvements in optical switch control. More particularly, the invention relates to advantageous systems and techniques for controlling multiple stage thermo-optical switching apparatus so as to conserve power and reduce undesired crosstalk or leakage signals.

BACKGROUND OF THE INVENTION

Devices employing optical signals are widely used, and these devices often use multiple stage arrays of optical switches to direct signals where they are needed. Frequently, a signal must be routed to one of a number of alternative outputs, and this routing is conveniently accomplished by supplying the signal to an input of a switch array and then setting switches of the array to route the signal to the desired output. Switch arrays may conveniently be constructed of binary switches, each binary switch having a single input and two outputs. Through the use of appropriate combinations of such switches, it is possible to construct an array that allows a signal to be routed to one of any number of alternative outputs, and to transfer the signal from one output to another as needed.

Thermo-optical binary switches are available that have three states. Each state requires a different power level. A first state is a "cold" state in which the application of power is very low or nonexistent. In this state, the switch routes the signal to a first, or "up" output. This state may conveniently be referred to as an "up" state. In this state, the switch directs a signal to a first output. The signal directed to the first output is at substantially the same level as the signal at the input, but a small signal resulting from crosstalk or leakage may also be present at the second output. A suitable standard for such a crosstalk signal for a switch in the "cold" state is that it be at a level representing an attenuation of over −10 dB. That is, the crosstalk signal must be less than 10% of the input signal.

A second state is a low power, or "off" state in which the application of power is low, but not so low as in the "cold" state. This state may also be referred to as an "up" state, because a switch in this state routes a signal to the "up" output. The signal directed to the first output is at substantially the same level as the signal at the input, but a small signal resulting from crosstalk is present at the second output. This crosstalk signal is at a very low level, and may be at a level representing an attenuation of over −20 dB. That is, the crosstalk signal must be less than 1% of the input signal.

The third state is a high power, or "on" state. In this state, the switch directs a signal to the second output, which may also be referred to as a "down" output. The signal directed to the second output is at the same level as the signal at the input, but a small signal resulting from crosstalk is present at the first, or "up" output. A suitable requirement for this crosstalk signal is that it meet the same restrictions as the crosstalk signal produced at the "down" output of the switch when the switch is in the "off" state. That is, the crosstalk signal must be at a level representing an attenuation of over −20 dB, or less than 1% of the input signal.

The array output to which the input signal is routed at any particular time under consideration may be referred to as the bright output. All other array outputs may be referred to as dark outputs. It is important to insure that signal levels at the dark outputs are at a very low level, in order to prevent errors resulting from misinterpretation of crosstalk or leakage signals. Frequently, multiple switch arrays are used in an application with one output of each of a number of switches being connected to a multiplexer. If crosstalk or leakage signals at the switch array outputs are not properly constrained at a desired low level, multiple crosstalk signals at a multiplexer or similar device may be misinterpreted, causing the device to produce a spurious output signal.

In order to achieve a desired attenuation of signal levels at the dark outputs, shutters may be used. Typically, a shutter is used for each array output, with each shutter having an input connected to a switch output, with the output of a shutter forming an associated array output. Each shutter may be in a "cold", "off", or "on" state. The "off" states may also be referred to as "up" states, and when the shutter is in an "up" state the signal is blocked. "Cold" or "off" shutters introduce attenuation similar to that introduced by "cold" or "off" switches, respectively. When a shutter is in an "on" or "down" state, the shutter passes the signal substantially without attenuation.

It is highly desirable to direct the signal to a desired output of an array, while minimizing the signal levels appearing at other outputs of the array. During stable operation of a switch, that is, after a sufficient time has passed following a switch transition, the above description of the switch states is accurate. However, during a switch transition, the signal level at each output cannot be reliably predicted. During a transition, the output at each switch may range from the same level as the input signal, down to the crosstalk signal level prescribed for stable switch states. In switch arrays, the outputs of switches are frequently used as the inputs of other switches, and unpredictability of signal levels during switch transitions may be amplified as unknown signals are applied to switches which then route the signals in unknown ways. After switching is finished, the outputs of the switch array will be stable and predictable, but significant uncertainties may prevail during transitions. In addition, optical switch arrays are often used in very small devices, where minimizing heat dissipation is highly desirable, leading to a need for power conservation in the design and operation of the switch arrays.

There exists, therefore, a need for systems and techniques for construction and management of arrays of binary thermo-optical switches that consistently reduce transient effects and power dissipation experienced by the arrays, and for arrays of switches that operate so as to reduce transient effects and power dissipation.

SUMMARY OF THE INVENTION

A switch array according to an aspect of the present invention operates in order to achieve reduced power consumption and maintain crosstalk within acceptable limits. Various switching rules may advantageously be applied in order to insure that the desired criteria are met.

In order to reduce undesirable transient effects, switching from one output to another is accomplished in a sequence chosen to maximize the number of transitions that occur in portions of the array that are not carrying a signal, and to minimize the number of transitions that occur in portions of the array carrying the signal. First, the old bright output and new bright output of the array are identified. The old bright output is the output to which the signal is routed before switching and the new bright output is the output to which the signal is routed after switching. A pivot node is then identified. The pivot node is the lowest common denominator node between the old and new bright outputs. The bright subtree of the pivot node is the bright output of this node, as well as all array elements and outputs descending from that output. The dark subtree of the pivot node is the dark output of this node, as well as all array elements and outputs descending from that output.

In order to reduce transient effects, switching operations are first performed in the dark subtree of the pivot node, in order to prepare the path that the signal will take after the pivot node is switched. After switching of the pivot node, the dark subtree of the pivot node will be the bright subtree. In addition to preparing the path, switching operations are performed that will maintain proper crosstalk control and will allow reduced power consumption. After these operations are performed, the pivot node is transitioned. Operations are then performed in the new dark subtree of the pivot node, which was previously the bright subtree. These operations are performed in order to reduce power consumption, and are sequenced in such a way that crosstalk limits are not violated.

A more complete understanding of the present invention, as well as further features and advantages of the invention, will be apparent from the following Detailed Description and the accompanying drawings.

BRIEF DESCRIPTION OF THE DRAWINGS

FIGS. 1A–1C illustrate various states of operation of a thermo-optical switch operable according to an aspect of the present invention;

FIGS. 5A–5E illustrate various stages of operation of an array of thermo-optical switches as the input signal of the array is switched from one output of the array to another according to an aspect of the present invention;

DETAILED DESCRIPTION

Figure 1D:
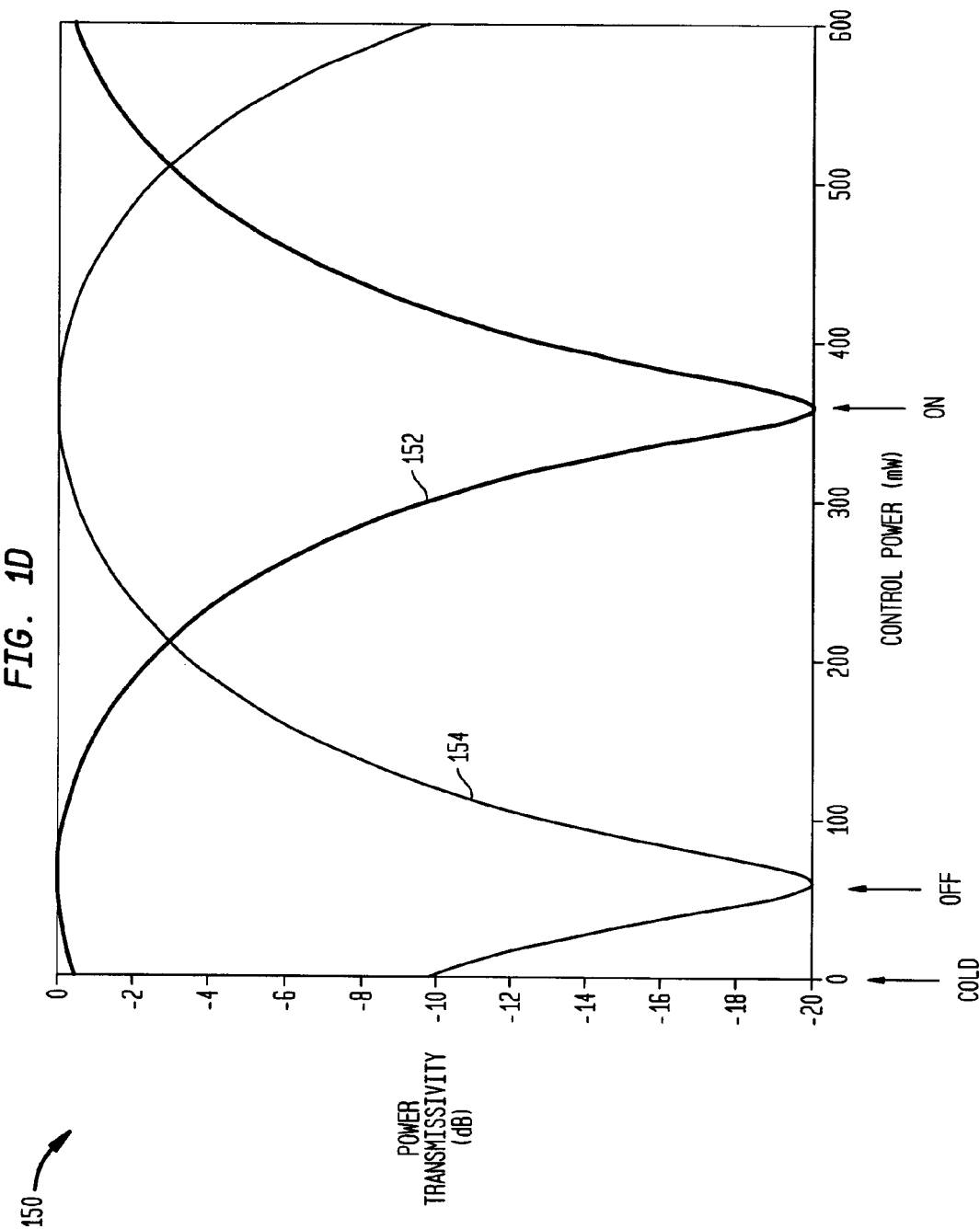
FIG. 1D illustrates a set of power curves showing the relationship between control current applied to a switch and optical power appearing at the outputs of the switch.

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

FIG. 1A illustrates an exemplary binary thermo-optical switch 100 which may suitably be used in arrays constructed and operated according to various aspects of the present invention. The switch 100 has an optical signal input 102 for receiving an optical signal, and first and second outputs 104 and 106, respectively. The switch 100 also includes a control input 108 allowing the switch 100 to receive an electrical control signal. The electrical control signal suitably comprises an electrical current, and the switch 100 routes the optical signal to one of the outputs 104 or 106 depending on the level of the control signal. In addition, the level of the control signal determines the amount of crosstalk or leakage allowed when the switch 100 is in an "up" state. The switch 100 is shown in FIG. 1A in a very low power, or "cold" state, in which the level of the control signal is very low or nonexistent. In this state, the switch 100 routes the input signal to the "up" output 104. In this state, a crosstalk or leakage signal of up to 10% of the applied signal may appear at the output 106. If the signal at the input 102 has a level of x, the signal at the output 104 has a level of substantially x and the signal at the "down" output 106 has a level of less than 10% of x, that is, of less than x reduced by an attenuation of −10 dB.

FIG. 1B illustrates the switch 100 in a low power, or "off" state. In this state, a low current level is applied to the control input 108 of the switch 100. Although low, this current is higher than that applied when the switch 100 is in the "cold" state. When the switch 100 is in the "off" state, if the signal at the input 102 has a level of x, the signal at the output 104 has a level of substantially x and the signal at the output 106 has a level of less than 1% of x, that is, of less than x reduced by an attenuation of −20 dB.

FIG. 1C illustrates the switch 100 in a high power, or "on" state. In this state, a high current level is applied to the control input 108 of the switch 100. In the "on" state, if the signal at the input 102 has a level of x, the signal at the "down" output 106 has a level of substantially x and the signal at the "up" output 104 has a level of less than 1% of x, that is, of less than x reduced by an attenuation of −20 dB.

In the switch 100 illustrated in FIGS. 1A–1C, the very low power state illustrated in FIG. 1A may be referred to as a "cold" state or an "up" state, and the output 104 may be referred to as an "up" output. Similarly, the low power, or "off" state illustrated in FIG. 1B may also be referred to as an "up" state.

The high power state illustrated in FIG. 1C may be referred to as an "on" state or a "down" state and the output 106 may be referred to as an "on" output or a "down" output. The low power and very low power states are referred to as "up" states because diagrams of such switches, such as those illustrated in FIGS. 1A–1C, often comprise a circle with the outputs extending upward and downward at an angle from the circle. The output that is shown in the diagram as extending upward is the output to which the signal is routed when the switch is in the low power or very low power state, and the output that is shown in the diagram as extending downward is the output to which the signal is routed when the switch is in the high power state.

FIG. 1D is a graph 150 showing optical signal power transmissivity, measured in dB, plotted against control signal power, measured in milliwatts (mW), and illustrating the behavior of a switch such as the switch 100. The graph 150 includes a curve 152, showing the optical signal level at the "up" output, as well as a curve 154, showing the optical signal level at the "down" output. An examination of the curves 152 and 154 shows that when the control signal power is at a very low level, such as 0 mW, such that the switch is in the "cold" state, the optical signal at the "up" output, as illustrated by the curve 152, appears substantially without attenuation, while the optical signal at the "down" output, as illustrated by the curve 154, experiences an attenuation of −10 dB. When the control signal power is at a low level, such as 50–60 mW, such that the switch is in the "off" state, the optical signal at the "up" output, as illustrated by the curve 152, still appears substantially without attenuation, but the optical signal at the "down" output, as illustrated by the curve 154, experiences an attenuation of −20 dB. When the control signal power is at a high level, such as 350–360 mW, such that the switch is in the "on" state, the optical signal at the "down" output, as illustrated by the curve 154, appears substantially without attenuation, while the optical signal at the "up" output, as illustrated by the curve 152, experiences an attenuation of −20 dB.

Figure 2:
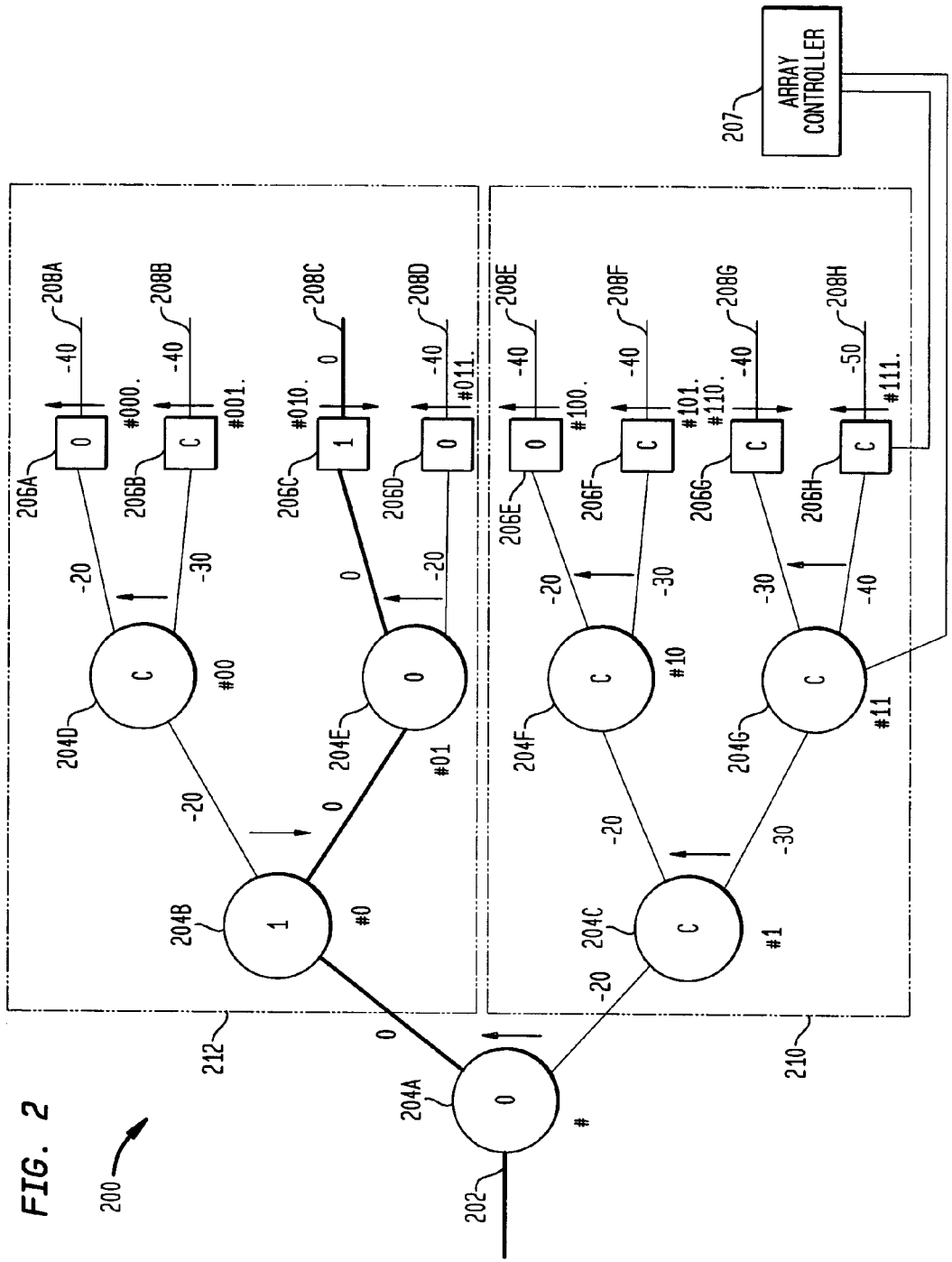
FIG. 2 illustrates an array of thermo-optical switches according to an aspect of the present invention, showing a specified signal routing and illustrating relationships between various branches of the array.

FIG. 2 illustrates a switch array 200, comprising a plurality of binary thermo-optical switches similar in operation to the switch 100. The array 200 includes an input 202, switches 204A–204G and shutters 206A–206H. A shutter is essentially a switch with no "up" output, used for management of crosstalk or leakage signals at outputs 208A–208H of the array 200. By using the shutters 206A–206H, it is possible to provide additional attenuation of leakage or crosstalk signals. One of the shutters 206A–206H in an "on" state passes its input through to its output, a shutter in a "cold" state provides −10 dB of attenuation and a shutter in an "off" state provides −20 dB of attenuation. As shown in FIG. 2, the array 200 also includes an array controller 207, that controls the application of an appropriate control current to each element, in order to set the state of the element to "cold," "off," or "on," as desired. For simplicity of illustration, only the connections of the controller 207 to the switch 204G and the shutter 206H are shown here, but the controller 207 suitably has connections to each switch and shutter of the array 200. The array controller 207 is illustrated here as an element of the switch array 200, but may be a separate element of a system for signal routing, with one array controller such as the controller 207 controlling a number of arrays. Furthermore, control of transitions need not be accomplished by a dedicated controller, but may instead be achieved as a function of another element of a system, such as a processor that controls the operation of switches while accomplishing other functions.

In the example shown, the array 200 is controlled so as to route the signal from the input 202 to the output 208C. The output 208C may suitably be referred to as the bright output and the path from the input 202 to the output 208C may suitably be referred to as the bright path. Paths and outputs may be referred to as "bright" or "dark" depending on whether or not they are carrying a signal at a particular moment in question. For example, the outputs 208A, 208B and 208D–208H are all dark, and the path from the switch 204A to the output 208E, via switches 204C, 204F, and 206E, is a dark path.

A subtree of a switch is a portion of the array comprising all paths originating at one of the outputs of the switch. Thus, the subtree 210 is a subtree of the switch 204A. The subtree 210 may also be referred to as the dark subtree of the switch 204A, because as illustrated in FIG. 2A, the output from which the subtree originates is dark. Conversely, the subtree 212 is the bright subtree of the switch 204A, because it originates from the bright output of the switch.

The primary path for an array is the path along which the signal travels. Thus, in FIG. 2, the primary path is the path from the input 202, through the switch 204A, to the switch 204B, to the switch 204E, to the shutter 206C, to the output 208C.

A suitable requirement for an array of binary switches is that substantially the full signal must appear at the bright output, and any signal appearing at outputs other than the bright output must be at least −40 dB below the signal at the bright output. The specific requirement of −40 dB is exemplary and it will be recognized that the systems and techniques of the present invention can be applied in order to meet this and similar requirements as desired, while providing a consistent way to achieve reduced power consumption and avoid transient deviations that will cause the output requirements to fail to be met. The following discussion describes a set of rules that can be applied to insure that output requirements will be met, referring to a set of figures illustrating points brought out in the discussion.

Figure 3:
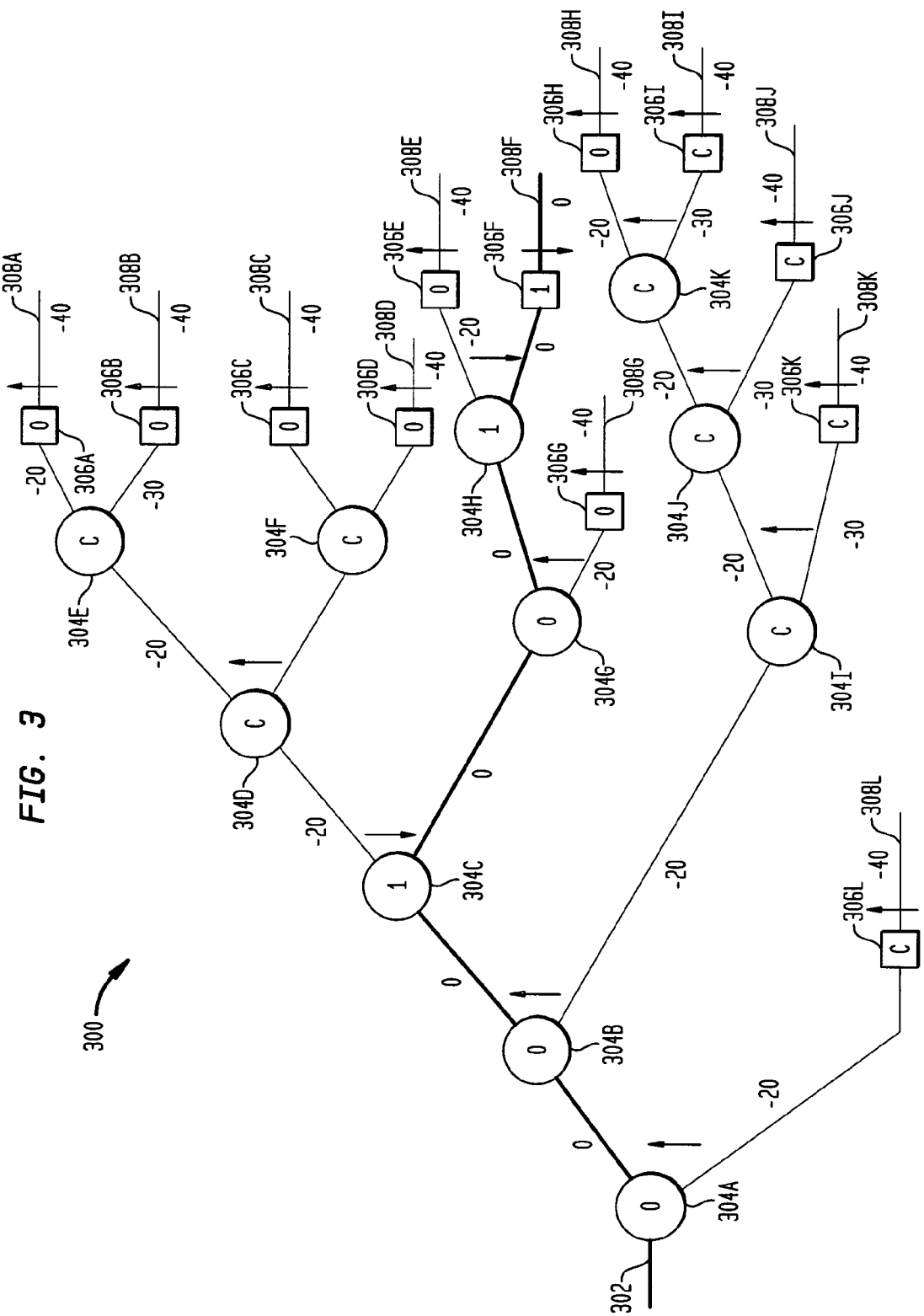
FIG. 3 illustrates an array of thermo-optical switches according to an aspect of the present invention, showing a specified signal routing and illustrating the effect of application of a set of switching rules on the signal levels appearing at the outputs of the array.

FIG. 3 illustrates an array of switches 300 in a stable state such that the maximum signal level at any dark output is −40 dB, with the switches set in such a way as to meet this output constraint while maintaining a relatively low power consumption.

As illustrated in FIG. 3, the switch array 300, comprises a plurality of binary thermo-optical switches 304A–304K, similar in operation to the switch 100. The array 300 includes an input 305 connected to the switch 304A, as well as shutters 306A–306L having outputs 308A–308L, which are the outputs of the array 300. In the example shown in FIG. 3, the array 300 is controlled so as to route the signal from the input 302 to the output 308F of the array. The output 308F is the bright output of the array 300 and the path from the input 302 to the output 308F is the bright path.

The array 300 is in a stable state, and the states of the switches 304A–304K and the shutters 306A–306L are such that the requirement of −40 dB attenuation is met at all dark outputs of the array 300, that is, at the outputs 308A–308E and 308G–308L. The states of the switches 304A–304K and the shutters 306A–306L are indicated by the designations "C" for "cold," "0" for "off" and "1" for "on." In addition, an arrow indicates the signal routing for each element. In the case of shutters, an "up" arrow indicates that the signal is blocked, and a "down" arrow indicates that the signal is passed through. The signal level, indicated in terms of decibels (dB) of attenuation, is indicated at each input and each output.

During stable operation of the array 300, four rules are applied that will consistently yield a −40 dB signal attenuation at the dark outputs, while providing a relatively low power consumption. The first rule is that "up" switches on the primary path must be "off," as explained in further detail below. It will be recalled that in the absence of this rule, or in situations in which the rule is not applicable, an "up" switch could be in either the "off" state or the "cold" state. Both these states, it will be remembered, provide a relatively low power consumption as compared to the "down" state, but the "off" state provides a higher attenuation at the dark output, at a cost of a somewhat higher power consumption than that of the "cold" state. The attenuation experienced at the dark output of the switch will be either −10 dB or −20 dB, depending on whether the switch is "cold" or "off".

It is possible that at least one shutter, such as the shutter 306G or 306L, for example, will receive the dark output of a switch that is in the primary path, and that the dark output of the switch will not undergo any further attenuation before arriving at the shutter. In such a case, in the absence of the first rule, the shutter would receive either –10 dB or –20 dB from the dark output of a switch, such as the switch 304G or the switch 304A, on the primary path, depending on whether the switch is "off" or "cold". The shutter can add only –20 dB of attenuation. Therefore, if the shutter receives –10 dB, the signal level at its output will be –30 dB, which does not meet the requirement of –40 dB. If the switch in the primary path is "off," the shutter will receive –20 dB and can then add as much as –20 dB. Therefore, if the switch in the primary path is "off," an output at the end of a path originating at the "dark" output of that switch can have a level of –40 dB.

FIG. 3 further illustrates other aspects of the rule that all "up" switches in the primary path must be "off". The switch 304B is a convenient example for discussion. The switch 304B is an "up" switch in the primary path, which is the path from the input 302 to the output of the shutter 306F. As an "up" switch in the primary path, the switch 304B is required to be "off." The input of the switch 304B receives substantially the full input signal. The input signal enters the array at the input of the switch 304A. The switch 304A is in an "up" state, and passes the signal to its "up" output without any attenuation. The "up" output of the switch 304A supplies the input to the switch 304B, so that essentially the full input signal is received at the switch 304B. If the switch 304B is in an "off" state, the dark, or "down" output of the switch 304B is at –20 dB. This –20 dB is switched on a path leading through cold switches 304I, 304J and 304K and leading to the shutter 306H. The shutter 306H is in the default path from the switch 304B to the output of the shutter 306L. The default path from one element to another is the path along which a signal does not undergo further attenuation. The dark output of the switch 304B is supplied to the switch 304I. The switch 304I is in a "cold" state, and the path from the switch 304I to the shutter 306H originates at the "up" output of the switch 304I, and passes through the switches 304J and 304K before reaching the switch 306H. The switches 304I, 304J and 304K are all in the "cold" or "up" state. The signal entering the switch 304I does not experience any substantial attenuation as it travels from the input of the switch 304I through the switches 304J and 304K, and to the shutter 306H. Therefore, the signal from the dark output of the switch 304B is at –20 dB, and this signal arrives at the input of the shutter 306H at a level of –20 dB. The shutter 306H can add no more than –20 dB to the signal received at its input, because –20 dB is the most that any element can add. The shutter 306H is able to add –20 dB of attenuation, and so can bring the output signal to the required level of –40 dB of attenuation, but the required level of –40 dB can be achieved only because the dark output of the switch 304B is at a level of –20 dB. Because the dark output of the switch 304B is on the primary path, it needs to be "off" in order for its "down" output to be at a level of –20 dB. The first rule requires that the switch 304B be in the "off" state, and therefore insures that its "down" output will be at –20 dB. If the switch 304B were "cold," its "down" output would be at –10 dB, the input to the shutter 306H would be at –10 dB and the output of the shutter 306H would be at –30 dB.

Other switches, such as the switch 304I, are not in the primary path. A switch that is not in the primary path does not need to be "off," but instead can be "cold." The reason that such a constraint is not required for switches not in the primary path is that a switch that is not in the primary path does not receive the full signal, but instead receives an attenuated signal. A switch not in the primary path receives the dark output of another switch, and therefore a switch not in the primary path applies further attenuation to a signal that has already been attenuated. Because the switch that is not in the primary path is applying further attenuation to an already attenuated signal, it does not need to apply as much attenuation as would a switch that was receiving the full signal. Thus, such a switch does not need to be "off" because it does not need to contribute a full –20 dB of attenuation. The second rule takes advantage of this fact.

The second rule is that all switches not in the primary path may be "cold". The condition imposed by the first rule provides that if a switch is not in the primary path, it will receive a signal with at least –20 dB of attenuation. The reason for this is that if a switch is not in the path, its input will originate at a dark output of an "off" or "on" switch. "On" or "down" switches contribute –20 dB to their dark subtrees, and "off" switches contribute –20 dB to their dark subtrees. The first rule provides that all "up" switches" in the primary path will be "off." Therefore, no switch in the primary path will be "cold," and no switch in the primary path will contribute –10 dB to its dark subtree. Instead, all switches in the primary path will contribute –20 dB.

Thus, in the worst case, any switch not in the primary path will receive no more than –20 dB as an input. In addition, a switch that is not in the primary path might not receive its input directly from a switch in the primary path. Instead, additional elements might appear before the switch under consideration, so that the switch would then receive even less than –20 dB at its input. However, the worst case input for a switch not in the primary path is –20 dB, and this input level still allows the switch to be "cold," while insuring that the output constraints will be met. If a switch is "cold," its outputs will be at –20 dB and –30 dB. A shutter connected to the "up" output of the switch will be able to contribute another –20 dB, and will be able to meet the requirement that no more than –40 dB be present at the output of the shutter. A shutter connected to the "down" output of the switch can be "cold" and can contribute another –10 dB while in the "cold" state, thereby meeting the requirement that no more than –40 dB be present at its output.

FIG. 3 also illustrates the application of the second rule. The switch 304I, for example, is not in the primary path, and receives only –20 dB from the "off" switch 304B. The switch 304I adds no further attenuation to its "up" subtree, so that its "up" subtree is at –20 dB. The switch 304I adds another –10 dB to its dark subtree, which is its "down" subtree. The signal entering the "down" subtree of the switch 304I is therefore at –30 dB. A shutter terminating the path originating at the switch 304I can always contribute the additional attenuation required to bring the output to the required level of –40 dB. For example, the shutter 306H contributes –20 dB of attenuation and the shutter 306K contributes –10 dB of attenuation. The path from the switch 304I to the shutter 306H leads through the switches 304J and 304K, but they add no additional attenuation to their "up" outputs. The switches 304J and 304K are also switches that are not on the primary path, and so they can be in a "cold" state. These switches also add –10 dB of attenuation to their "down" outputs, so that each of the shutters 306I and 306J is able to achieve the requirement of –40 dB by adding an additional –10 dB of attenuation.

The third rule is that a default shutter in a dark subtree of a switch in the primary path must be "off." A default path, such as the path from the switch 304B through the switches 304I, 304J and 304K and to the shutter 306H is a path along which no further attenuation occurs, and a default element is an element lying in that path. According to the first rule, a switch in the primary path is "off" or "on" and not "cold," and therefore contributes −20 dB to its dark subtree. Because the default shutter is the shutter in the path along which no further attenuation occurs, the default shutter will receive −20 dB. Because the default shutter will receive −20 dB, it must be "off" in order to contribute an additional −20 dB, so that its output will be at −40 dB.

For example, in FIG. 3, five switches in the primary path have dark subtrees. These are the switch 304A, the switch 304B, the switch 304C, the switch 304G and the switch 304H. The default path of the dark subtree of the switch 304A leads directly to the shutter 306L, so this default shutter must add −20 dB of attenuation and must therefore be "off." The default path of the dark subtree of the switch 304B leads to the switch 304I, to the switch 304J, to the switch 304K, to the shutter 306H. No additional attenuation is added in the path to the shutter 306H, so this default shutter must also be "off." The default path of the dark subtree of the switch 304C leads to the switch 304D, to the switch 304E, to the shutter 306A. No additional attenuation is added along the path to the shutter 306A, so this shutter must also be "off." The dark subtree of the switch 304G leads directly to the shutter 306G, which must be "off," and the dark subtree of the switch 304H leads directly to the shutter 306E, which must be "off."

The final rule is that all other, or non-default, shutters may be "cold." Non-default shutters on a dark subtree will receive at most −30 dB. If a subtree is dark, it will originate with no more than −20 dB, and if a shutter is not the default shutter of a subtree, at least one additional element contributing attenuation will lie between the shutter and the origin of the subtree. Thus, at least an additional −10 dB of attenuation will be added by the time the path arrives at the non-default shutter. Thus, the −10 dB of attenuation provided by a shutter in a "cold" state will achieve the desired −40 dB.

FIG. 3 also illustrates the application of the fourth rule. For example, the shutters 306I, 306J and 306K are non-default shutters in the dark subtree of the switch 304B. By the first rule, the switch 304B is "off" and therefore contributes no more than −20 dB to its dark subtree. The shutter 306K is not in the default path of the dark subtree of the switch 304B. Instead, the shutter 306K is in the dark subtree of the switch 304I, and the switch 304I is in the dark subtree of the switch 304B. The input at the switch 304I is −20 dB, and the switch 304I "cold" contributes an additional −10 dB of attenuation at its dark output. Therefore, the dark output of the switch 304I is at −30 dB, so that the input of the shutter 306K is at −30 dB. Similarly, the dark output of the switch 304J intervenes between the shutter 306J and the switch 304B, and the dark output of the switch 304K intervenes between the shutter 306I and the switch 304B. Each of the shutters 306K, 306J and 306I receives −30 dB at its input. Therefore, the −10 dB added by these shutters in a "cold" state meets the requirement that the signal level at the output be no greater than −40 dB.

The above rules take advantage of the fact that components that are not on the primary path will have an attenuated input. Following the first rule insures that all dark paths will have an initial input of −20 dB. A "cold" switch that receives an input of −20 dB will produce −30 dB at its dark output. If a shutter receiving this dark output is in a "cold" state, the output of the shutter will be at −40 dB, given an input of −30 dB. On the other hand, the rules take into account the fact that a default shutter on a dark subtree will receive the full signal originating at the dark subtree. The first rule insures that a dark subtree of a switch will have no more than −20 dB and the third rule insures that a default shutter receiving this level of −20 dB will be set to provide another −20 dB of attenuation.

The above rules insure that constraints on output are met during stable operation of the switches. However, during transitions, substantial variations in outputs of transitioning switches can occur. These variations can cause widely varying transients at the outputs. During the transition of a switch having a signal applied, there cannot be said to be a reliable bright or dark output. Instead, during the transition of a switch with a signal level x at the input, each output may experience a signal ranging anywhere from the full signal x, down to less than 1% of x, that is, an attenuation greater than −20 dB. In order to prevent transient outputs while still allowing for simultaneous switching, a switch array according to an aspect of the present invention provides for management of switch transitions so as to prevent undesired transients, to allow for simultaneous switching, and to insure that power consumption by the switch array is as low as possible given the need to route the signal to the correct output and to achieve the desired attenuation at the other outputs.

Returning now to the array 200 of FIG. 2, a sequence of steps will now be described that will allow proper switching of an input signal from one output to another, without creating undesired transients and without violating attenuation constraints such as the exemplary rules presented above in connection with FIG. 3. These steps will be discussed in connection with the array 200, but they may be applied to the array 300 of FIG. 3, or to any array constructed using switches such as the switch 100 of FIGS. 1A–1C.

Figure 4:
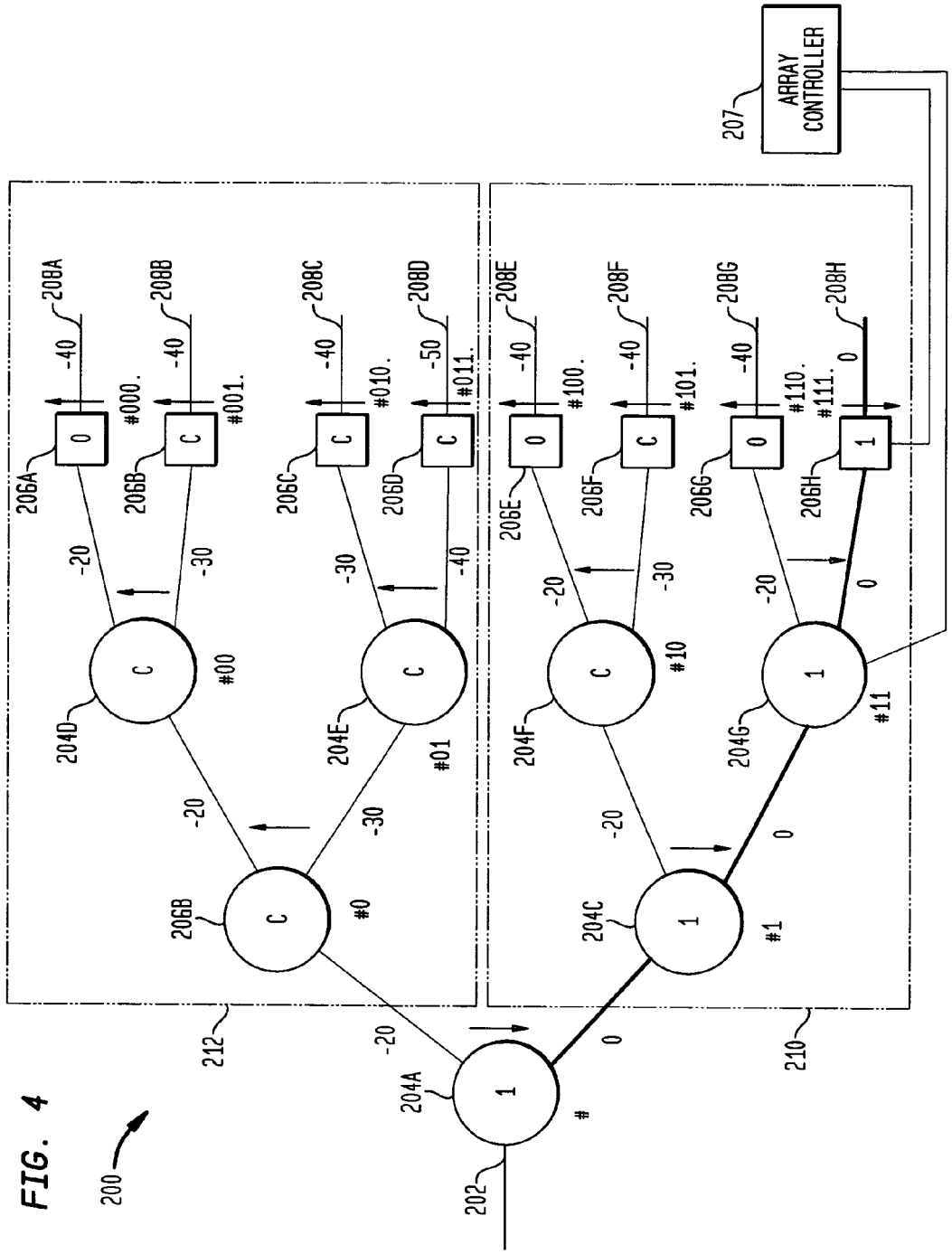
FIG. 4 illustrates the array of FIG. 2, after switching has taken place to route an optical signal to a different output than that illustrated in FIG. 2.

FIG. 4 illustrates the array 200, in a state reached after the array 200 has made a transition from the state represented in FIG. 2. In FIG. 4, the array 200 has been switched so that the signal is now on the output 208H, rather than the output 208C, as in FIG. 2. The transition is made according to techniques employing the teachings of the present invention. The bright output is the output 208H, and the bright path, or primary path, is the path from the switch 204A, to 204C, to 204G, to the shutter 206H, to the output 208H. This path may be referred to as the new bright path or new primary path, because it is the signal path achieved after switching. The output 208H may be referred to as the new output, or the new leaf. The primary path illustrated in FIG. 2 may be referred to as the old primary path, because it is the path present before switching, and the output 208C of FIG. 2 may be referred to as the old output or the old bright output. The switch 204A may be referred to as the pivot node. The pivot node is the lowest common ancestor between the old and new outputs. The subtree 212 containing the old primary path may be referred to as the old subtree, and the subtree 210 containing the new primary path may be referred to as the new subtree. In order to switch from the state shown in FIG. 2 to that shown in FIG. 4, the switch array 200 undergoes transitions in the new subtree, followed by a transition of the pivot node, followed by transitions in the old subtree. In this way, all transitions other than the transition of the pivot node will occur in a dark subtree. The transition of the pivot node will cause the signal to transition from the old subtree, which was already routing the signal properly without violating attenuation constraints, to the new subtree. Before the transition of the pivot node, the new subtree is set up to route the signal properly without violating attenuation constraints. After the transition of the pivot node, further transitions are made in the old subtree in order to reduce power consumption. Switch transitions may suitably be directed by the array controller 207.

A general five step procedure can be used to accomplish any transition while maintaining output constraints and providing for low power consumption after switching. This procedure can be applied to any array employing an arrangement of binary switches similar to those illustrated in FIGS. 1A–1C and described above. The first two steps of the procedure are taken in the new bright subtree. The first step is to identify any elements in the new bright subtree that are presently "cold," but will need to be "off" after switching has been completed, and to transition them to "off".

Figure 5A:
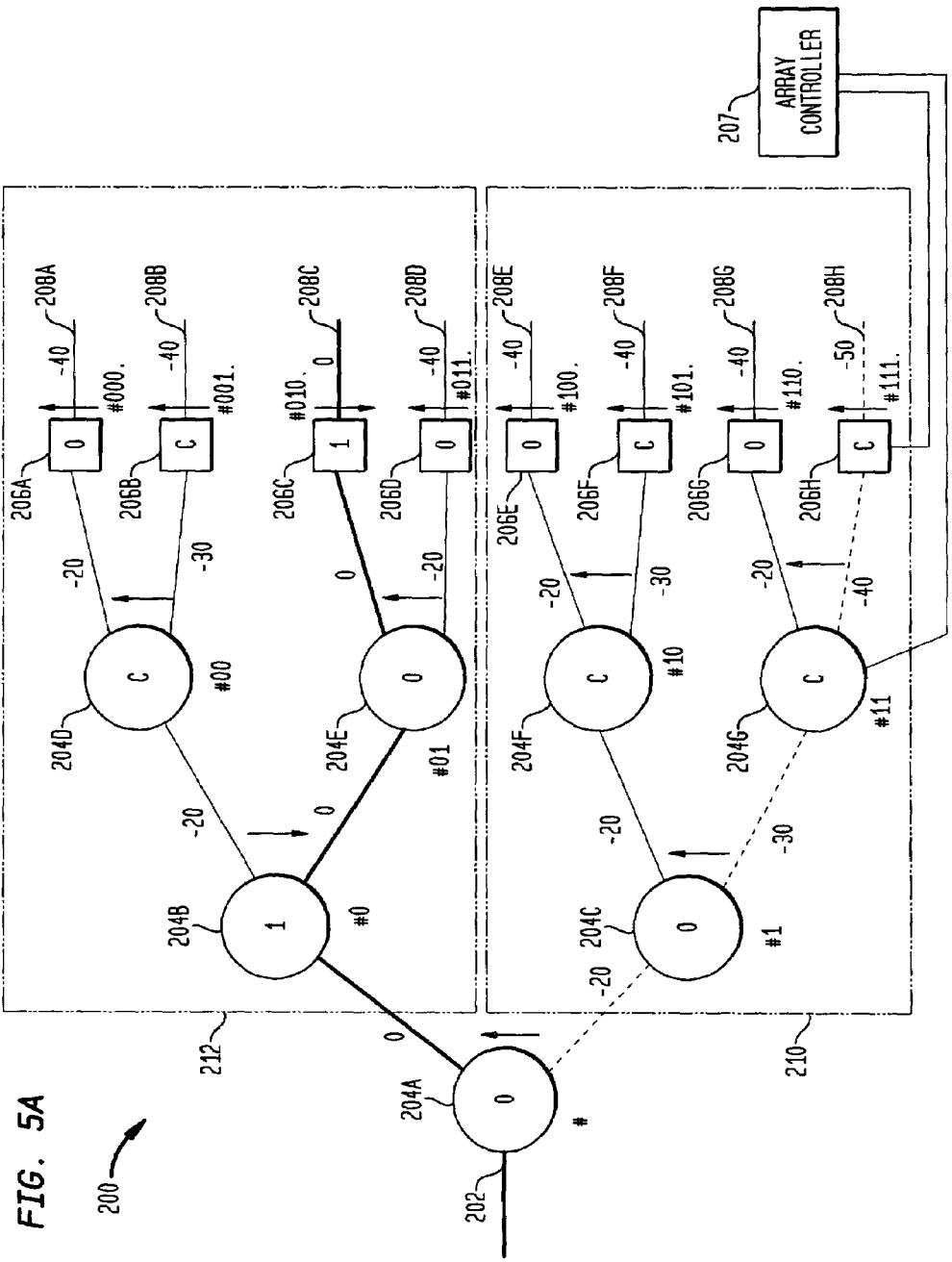

FIG. 5A illustrates the array 200 after it has originally started in the state depicted in FIG. 2, and the first step described above has been executed. The shutters 206E and 206G will need to be "off" after completion of switching, because they are default shutters in dark subtrees of switches in the new primary path. The shutter 206E is the default shutter of the switch 204C and the shutter 206G is the default shutter of the switch 204G. In the state depicted in FIG. 2, the shutter 206E is already "off" because it is the default shutter in the old dark subtree of the switch 204A, which is in the primary path. Therefore, the only shutter that has been changed in the transition from the state depicted in FIG. 2 to that depicted in FIG. 5A is the shutter 206G. The shutter 206G is changed because it is the default shutter of the switch 204G. The shutter 206H does not need to be changed, because transients at the old and new primary outputs can be allowed.

Figure 5B:
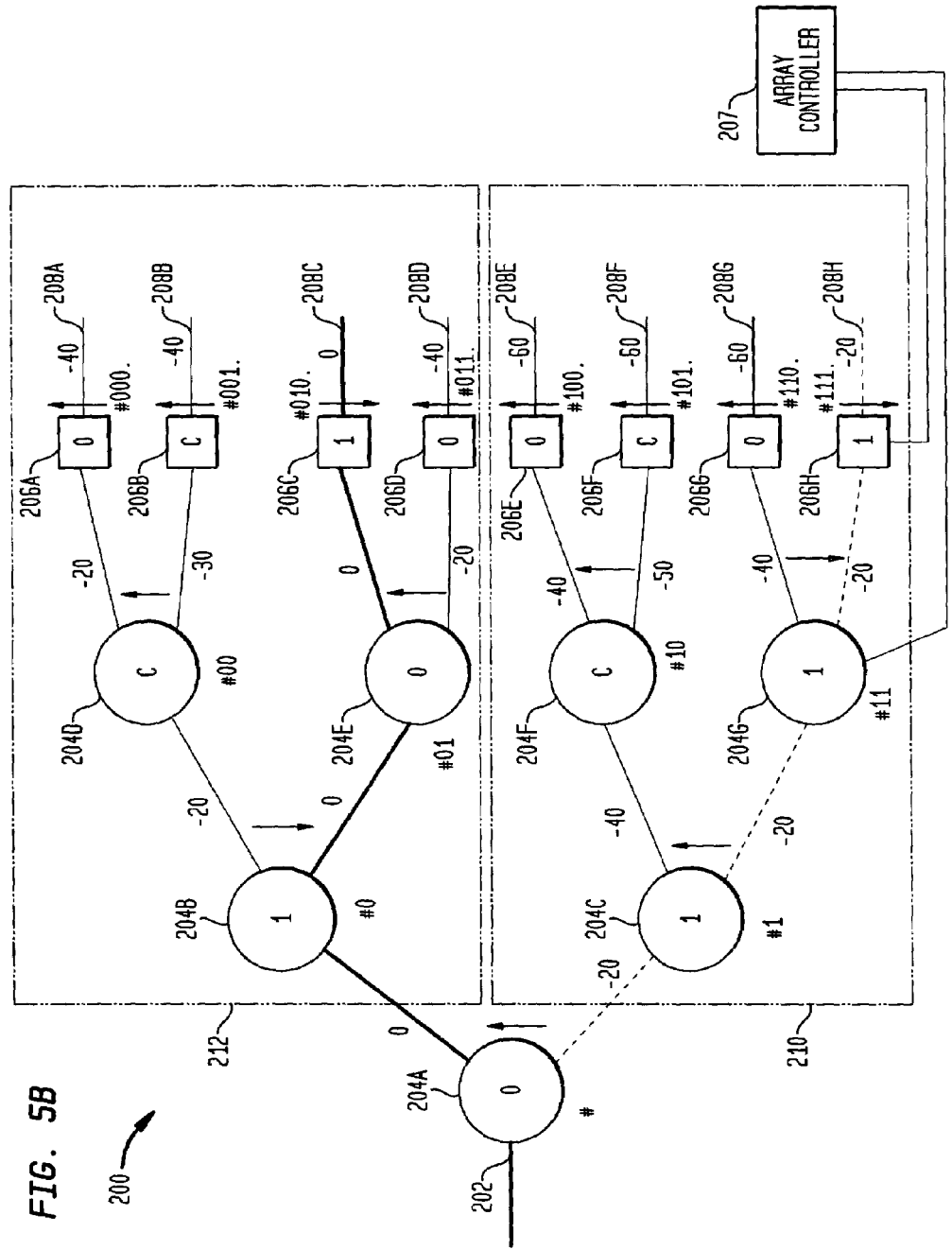

The second step is to transition any "up" switches and shutters that need to turn "down." The preferable state of a switch for power consumption purposes is "up," but some switches, of course, may need to be in a "down" state for proper routing. In addition, the new primary shutter will need to turn "on" or "down," in order to produce the signal at the correct output. FIG. 5B illustrates the array 200 after this second step has been executed, showing that the switches 204C and 204G, and the shutter 208H, have turned "down." At this point, the dark subtree 210 is receiving −20 dB. All of the elements in the dark subtree 210 are in such a state that the signal will be routed to the output 208H after the switch 204A transitions, and that other outputs 208E–208G will experience signal levels of no more than −40 dB.

Figure 5C:
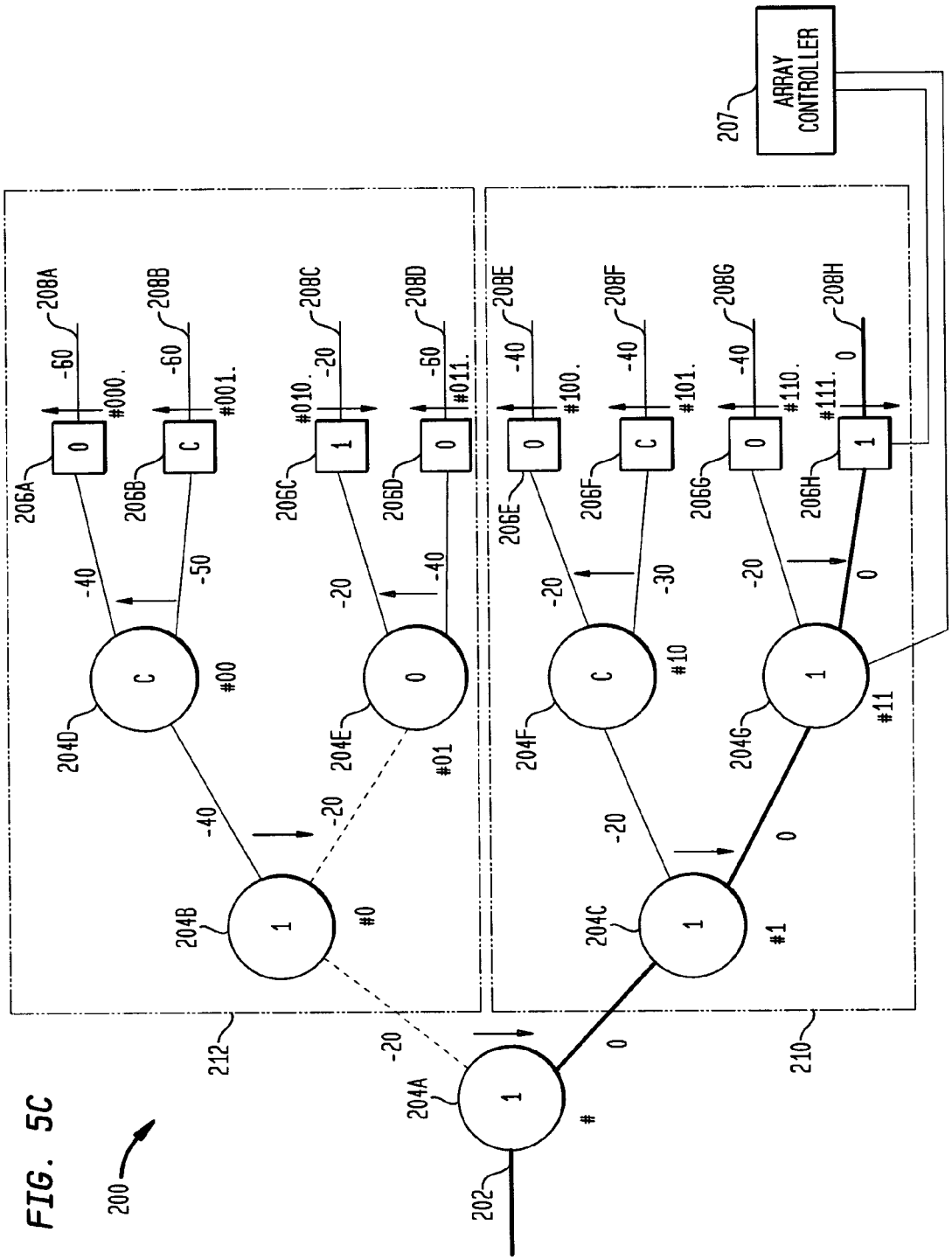

The third step is to transition the pivot node. FIG. 5C illustrates the array 200 after this step has been taken, showing that the pivot node 204A has been transitioned, the subtree 210 has become the bright subtree and the subtree 212 has become the dark subtree. Before the transition of the pivot node, both of the subtrees 210 and 212 were set to accommodate the full signal. The subtree 212 was previously accommodating the full signal and its settings did not change before the switch 204A was transitioned. The subtree 210 was set to accommodate the full signal before the transition of the switch 204A occurred. Therefore, transient variations occurring during transitioning of the switch 204A will not cause the signal level at any dark output to exceed −40 dB. This constraint was not violated at the subtree 212 before transitioning of the switch 204A, and at all points during the transition of the switch 204A, the subtree 212 will receive the full signal or less. The constraint will not be violated at the subtree 210 after transitioning of the switch 204A, and at all points during the transition of the switch 204A, the subtree 210 will receive the full signal or less.

After the transition of the switch 204A, as illustrated in FIG. 5C, the subtree 210 is receiving 0 dB. All of the elements in the subtree 210 were previously set to achieve the required output constraint and to route the signal properly. The signal is therefore being routed to the output 208H, and the other outputs 208E, 208F and 208G are at −40 dB. Because the shutter 208G was previously set to "off," it meets the constraint of −40 dB after its input increases to −20 dB. The subtree 212 is receiving −20 dB, but was previously set to receive the full signal, because its settings were not changed before the transition of the switch 204A. Therefore, all the outputs 208A, 208B, 208C and 208D meet the required constraints. The output 208C is at −20 dB, but it is the old primary output and is not subject to the constraint of −40 dB until after switching is completed.

Figure 5D:
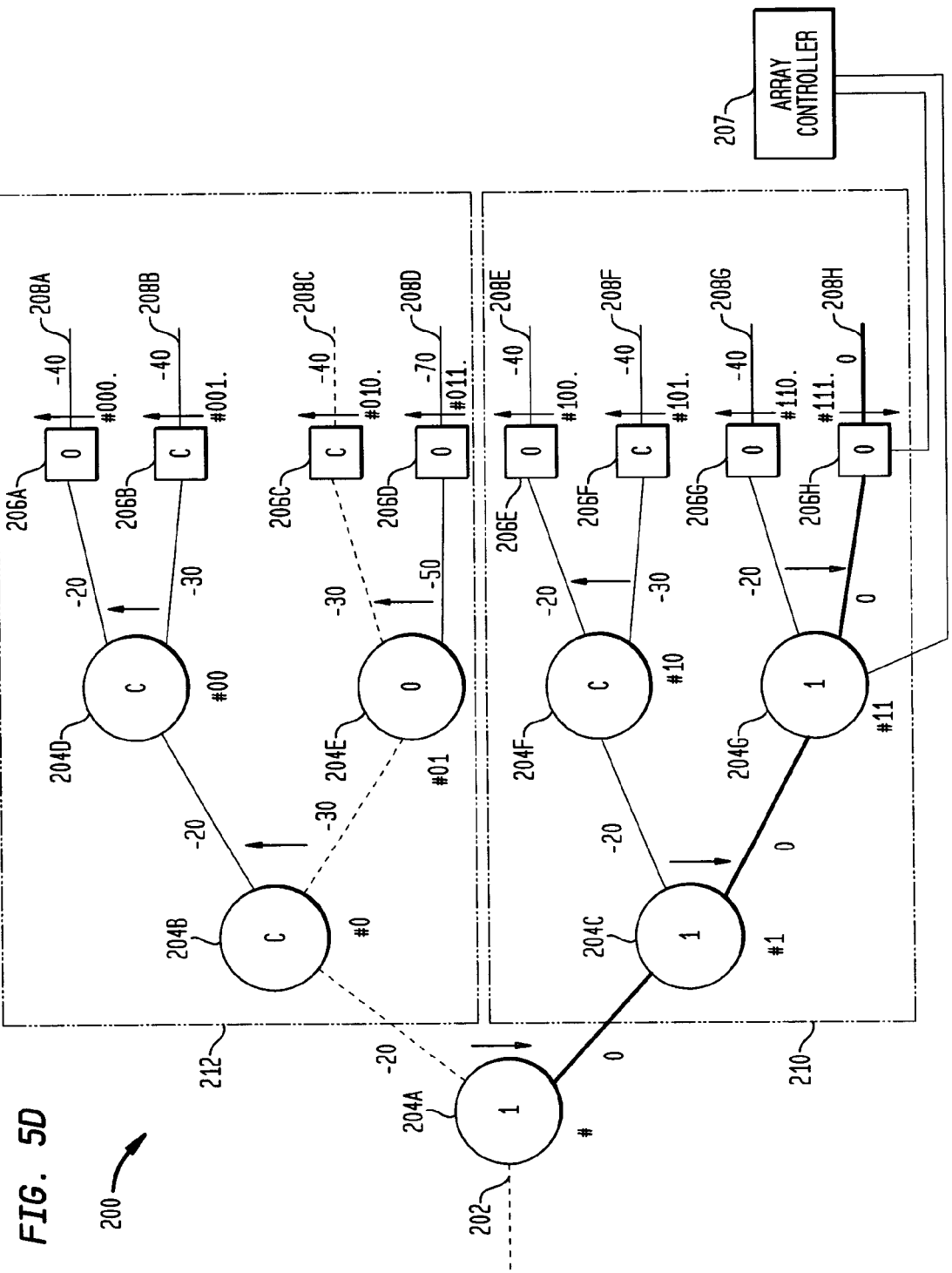

The fourth step is to set any "down" switches or shutters in the new dark subtree to "up," in order to reduce power consumption. FIG. 5D illustrates the array 200 after this step has been executed, showing that the switch 204B and the shutter 206C have been set to "cold." The new dark subtree 212 receives −20 dB, and each path in the subtree includes at least −20 dB of attenuation, so that the outputs are at no more than −40 dB. Bringing the elements to "up" also has the effect of reducing the signal level at the output 208C, because the shutter 206C is now set to "up" and in addition the output 208C is now in the dark subtree of the switch 204B.

The fifth step is to set all "off" switches and shutters in the new dark subtree, other than the default shutter of the pivot node, to "cold". FIG. 5E illustrates the array 200 after this step has been taken, showing that the switch 204E and the shutter 206D have been set to "cold." The shutter 208A remains in the "off" state because it is the default shutter of the pivot node. This operation achieves the condition specified by the third rule above, which is that the default shutter on the dark subtree must be "off," while conserving power by allowing other elements in the dark subtree to be "cold." The dark subtree of the pivot node receives −20 dB, and every shutter in this subtree other than the default shutter of the dark subtree receives this signal after it has been further attenuated by at least one element. Therefore, every element of the dark subtree other than the default shutter can be "cold."

If switches not having a "cold" state are used, the procedure can be simplified so that three steps are performed instead of five. In such a case, the three steps are simply to operate on the new subtree, changing any "up" switches that need to be "down," changing the pivot node, and then operating on the old subtree, changing all "down" switches to "up."

In order to provide a convenient way to identify array elements, paths and common elements between paths and to facilitate operations, the switches and shutters may be represented by binary labels, and these labels may be examined to identify parent switches, pivot switches, paths and subtrees. The labels comprise binary digits showing paths from the first switch of an array to the output. The array elements in FIGS. 2, 4, 5A–5E and FIG. 6 bear labels of this type, and the construction and use of the labels is described in further detail below.

Figure 6:
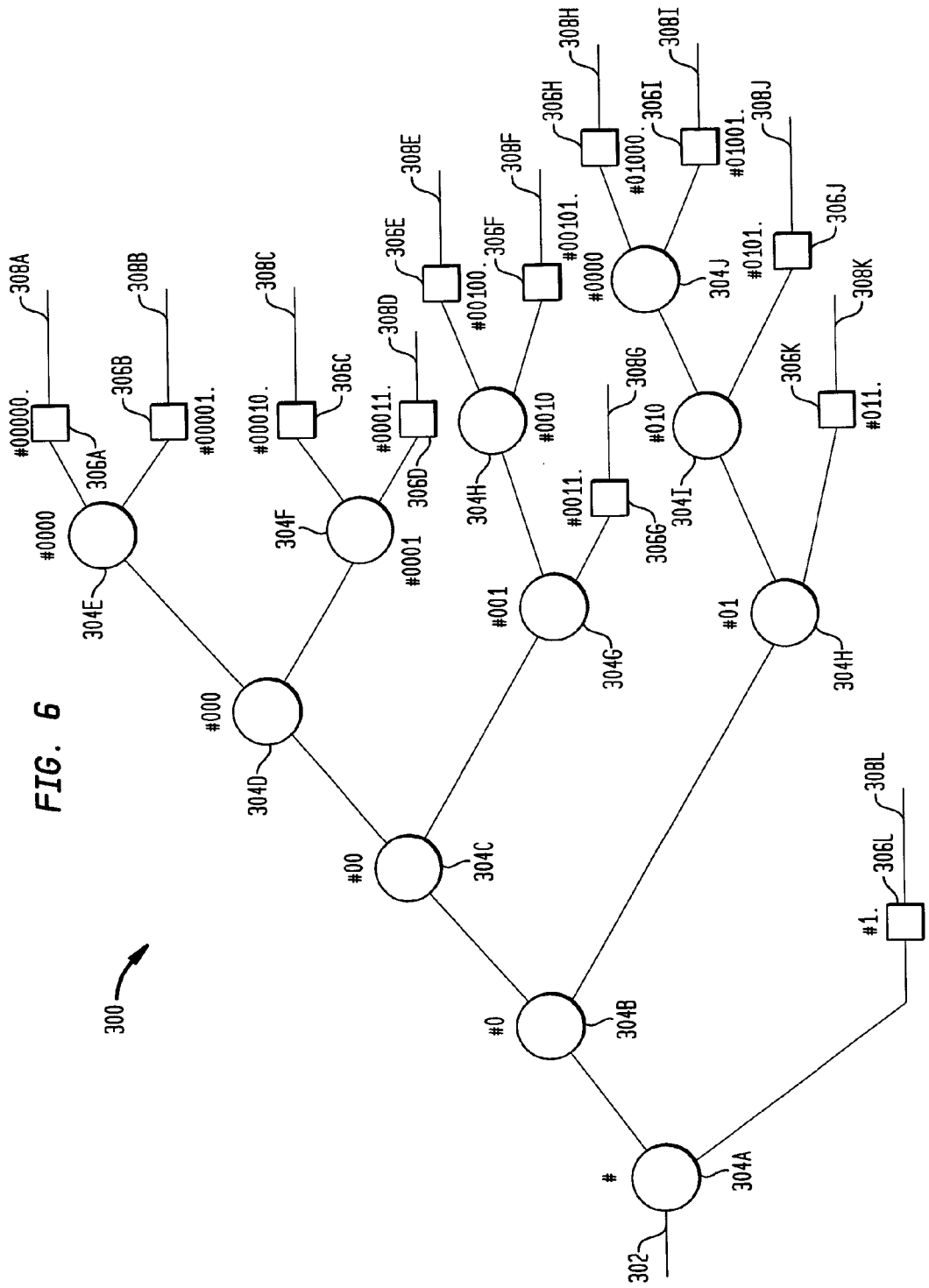
FIG. 6 illustrates an array of thermo-optical switches with elements of the array labeled according to a binary labeling system providing a simple way to show connections and relationships between elements according to an aspect of the present invention.

FIG. 6 illustrates the switch array 300, having its elements labeled for use in a switch management operation according to an aspect of the present invention. Similar labeling may be employed by an array controller such as the array controller 210 of FIGS. 2 and 4, in order to identify paths between elements and common elements between paths, and to designate the elements on which operations are to be performed. As shown in FIG. 3 and discussed above, the array 300 comprises an input 302, and switches 304A–304K, as well as shutters 306A–306L. Each of the outputs of the array is an output of a corresponding shutter.

Each element of the array is labeled, with the labeling system providing information about the switches and paths preceding each labeled element. The switch 304A is the root switch, and is labeled with the symbol "#". Each additional elements of the array has a label comprising the symbol "#" and one or more appended binary digits. Each labeled element other than the root switch 304A is connected to the "up" or "down" output of the preceding switch. The preceding switch may be referred to as a parent switch, and a switch or shutter connected to an output of the parent switch may be referred to as a child switch or shutter. If the label of a parent switch is x, the label of the "up" child, that is, the child connected to the parent's "up" output, is x0. The label of the parent's "down" child is x1. For example, the switch 304A is the parent of the switch 304B and the shutter 306L. The label of the switch 304A is "#," so the label of the switch 304B is "#0" and the label of the shutter 306L is "#1." Similarly, the label of the switch 304F is "#001," because it is the "down" child of the switch 304C, which bears the label "#00" because it is the "up" child of the switch 304B. The switch 304B bears the label "#0" because it is the "up" child of the switch 304A. In addition to a string of binary digits indicating the identity of its parent switch and its connection to the parent switch, the label of each shutter suitably includes a terminal dot or period ".", to provide an identification as a shutter. Each output is identified by the label of its shutter. The path to any particular output consists of all switches whose labels are prefixes of the shutter label. As an example, consider the output 308F. It is identified by the label of the shutter 306F. This label is "#00101." An examination of the label easily reveals the path to the shutter 306F, because the prefixes of the shutter label are "#0010", "#001", "#00", "#0" and "#", indicating that the switches in the path are the switches 304H, 304G, 304C, 304B and 304A. Comparisons of the various binary labels associated with switches and shutters makes it easy to identify bright and dark paths and old and new paths by simply identifying the element terminating the path under consideration and examining its label. The label of an output provides all information necessary to construct a path leading to that output. In addition, the pivot node between an old and new output, that is, the bright output of an array before a switching operation and the output that is to be the bright output after the switching operation, can easily be identified by examining the labels of the old and new output shutters. The pivot node is the switch whose label is the longest common prefix of both the label of the old output shutter and the label of the new output shutter. To take an example, consider the shutter 306F, whose label is "#00101.", and the shutter 306J, whose label is "#0101." The pivot node between these two shutters is the switch whose label is "#0", because "#0" is the longest common prefix of the two labels. The switch having this label is the switch 304B.

Finally, the labels such as those illustrated in FIG. 6 can easily be employed to identify the bright and dark subtrees of a switch. A subtree of a switch is one of the two child elements of that switch, as well as all elements having the child element as a parent. Each switch has two child elements, and the subtrees of a switch can be identified through examining the label of the switch, appending a "0" or a "1" to the label to identify the "up" and "down" children of the switch. The "up" and "down" children are the roots of the "up" and "down" subtrees of the parent. For example, in order to identify the subtrees of the switch 304B, first take the label of the switch, which is "#0". The "up" subtree of this switch is the switch labeled "#00" and all elements whose labels have "#00" as a prefix. The "down" subtree of the switch 304B is the switch labeled "#01" and all elements whose labels having "#01" as a prefix. The label of the switch that is the root of a subtree may be referred to as the subtree prefix.

In addition, the label of a switch, combined with its state, can be used to identify the bright and dark subtrees of a switch. For example, suppose that the state of the switch 304B is "down," represented by the digit "1". The bright subtree prefix of the switch is generated by appending the switch state to the switch label. Thus, the bright subtree of the switch "#0" is the switch "#01" and all elements having the switch "#01" as an ancestor. The dark subtree prefix is generated by appending the complement of the switch state to the switch label. Thus, the dark subtree of the switch "#0" is the switch "#00" and all elements having the switch "#00" a ancestor.

Figure 7:
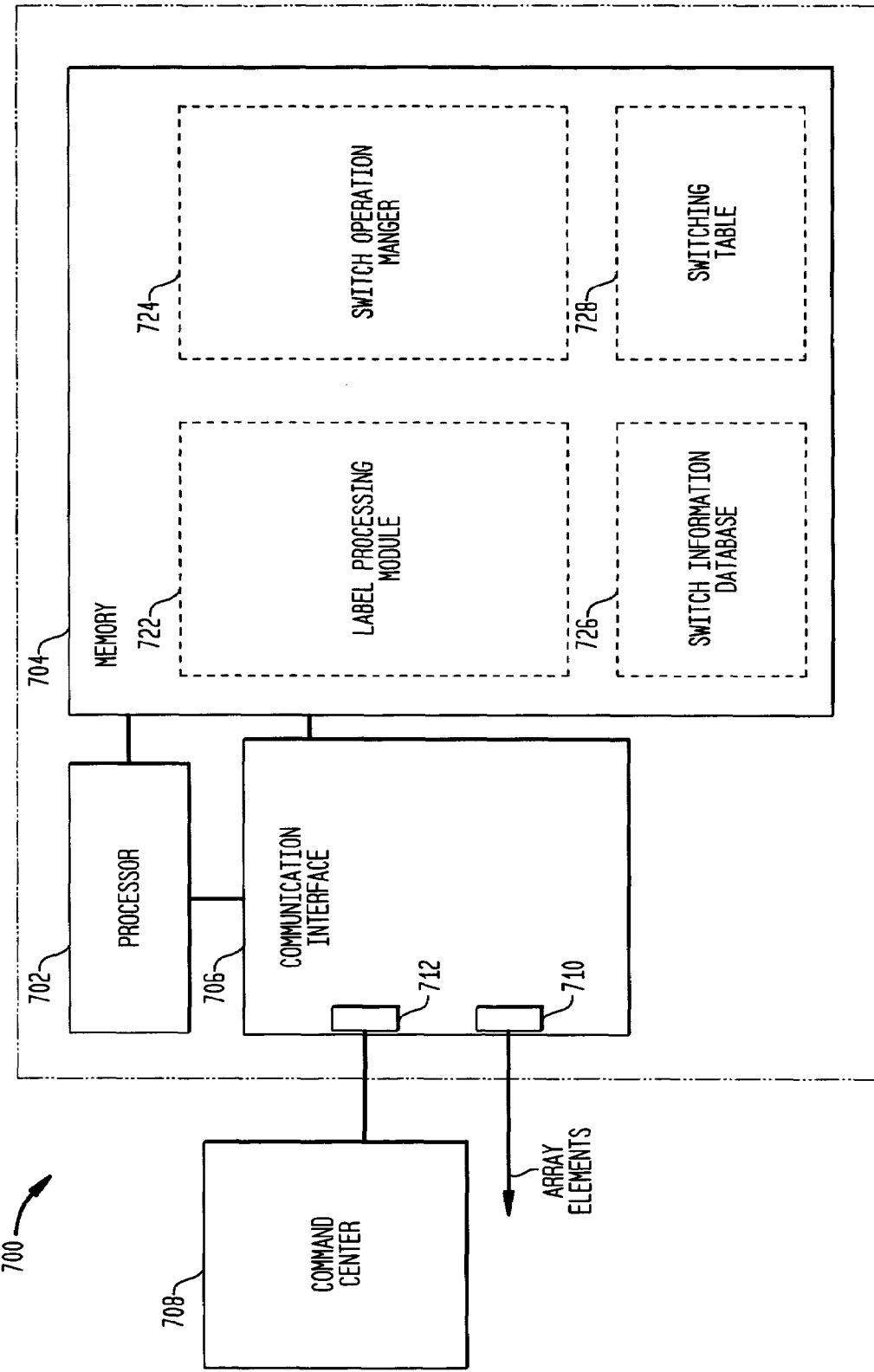
FIG. 7 illustrates a switch array controller according to an aspect of the present invention.

FIG. 7 illustrates an array controller 700 according to an aspect of the present invention. The array controller 700 suitably employs a labeling system such as that described above in order to associate switches with binary labels, and examines the labels to determine switch relationships and to make decisions about operations to be performed on switches. The controller 700 may suitably include a processor 702 and memory 704, as well as a communication interface 706. The communication interface 706 may suitably transmit control signals to control inputs belonging to elements of the array, such as switches and shutters. An example of a control input is the control input 108 of the switch 108 of FIG. 1, and the communication interface 706 transmits control signals to these control inputs in order to set the corresponding switches and shutters to desired states, such as "off," "on" or "cold," as required to achieve desired signal routing and to meet crosstalk constraints.

The communication interface 706 may also receive commands from a command center 708. The command center 708 suitably designates an array output to which an optical signal is to be routed, and the controller 700 responds by taking the steps necessary to route the signal to the indicated output. Switch arrays such as the arrays illustrated in FIGS. 2–4, 5A–5E and 6 may suitably be components of more complex systems, and any of a number of implementations of command centers may be used. For example, an optical communication system may include a number of switch arrays, and a command center such as the command center 708. The command center might direct output switching for each of a plurality of arrays, in response to events occurring during communication, and would transmit to each switch array a signal designating the desired output to each switch array. For each array, an array controller such as the controller 700 would manage the switching operations required to properly route the output.

The controller 700 may also include a first communication port 710 to allow a communication connection with the array elements, and a second communication port 712 to allow a communication connection with the command center 708.

The controller 700 suitably implements a label processing module 722 and a switch operation manager 724, that may suitably be software programs residing in the memory 704 and executed by the processor 702. The controller 700 may also suitably include a switch information database 726, including mapping information for associating switches and shutters with their binary labels, and also including state information associated with each switch and shutter. The database 726 may also reside in the memory 704.

The label processing module 722 obtains binary label and state information from the database 726, and performs operations on binary labels, such as examination of labels to identify paths, subtrees and nodes of interest using techniques described above in connection with the discussion of FIG. 6. The label processing module 722 then designates switches and shutters on which operations are to be performed, suitably by constructing a switching table 728 comprising a sequence of labels and associated operations, with the operations to be performed on the labeled elements in the order in which they appear in the switching table. The sequence of operations is preferably constructed so as to follow a sequence such as that described above in connection with the discussion of FIGS. 5A–5E and to follow specified rules for crosstalk reduction and power conservation such as those described above in connection with the discussion of FIG. 3.

The switch operation manager 724 suitably receives switching instructions from the label processing module 722, and associates each label and the instruction to be performed on the label with the switch indicated by the label, suitably using information extracted from the database 726. The switch operation manager 724 then transmits suitable directions to the communication interface 706, so that the communication interface will transmit proper control signals to appropriate switches and shutters. Preferably, operations are performed simultaneously when possible and operations that are performed in sequence are separated by suitable delays, as called for by the switch designs.

Figure 8:
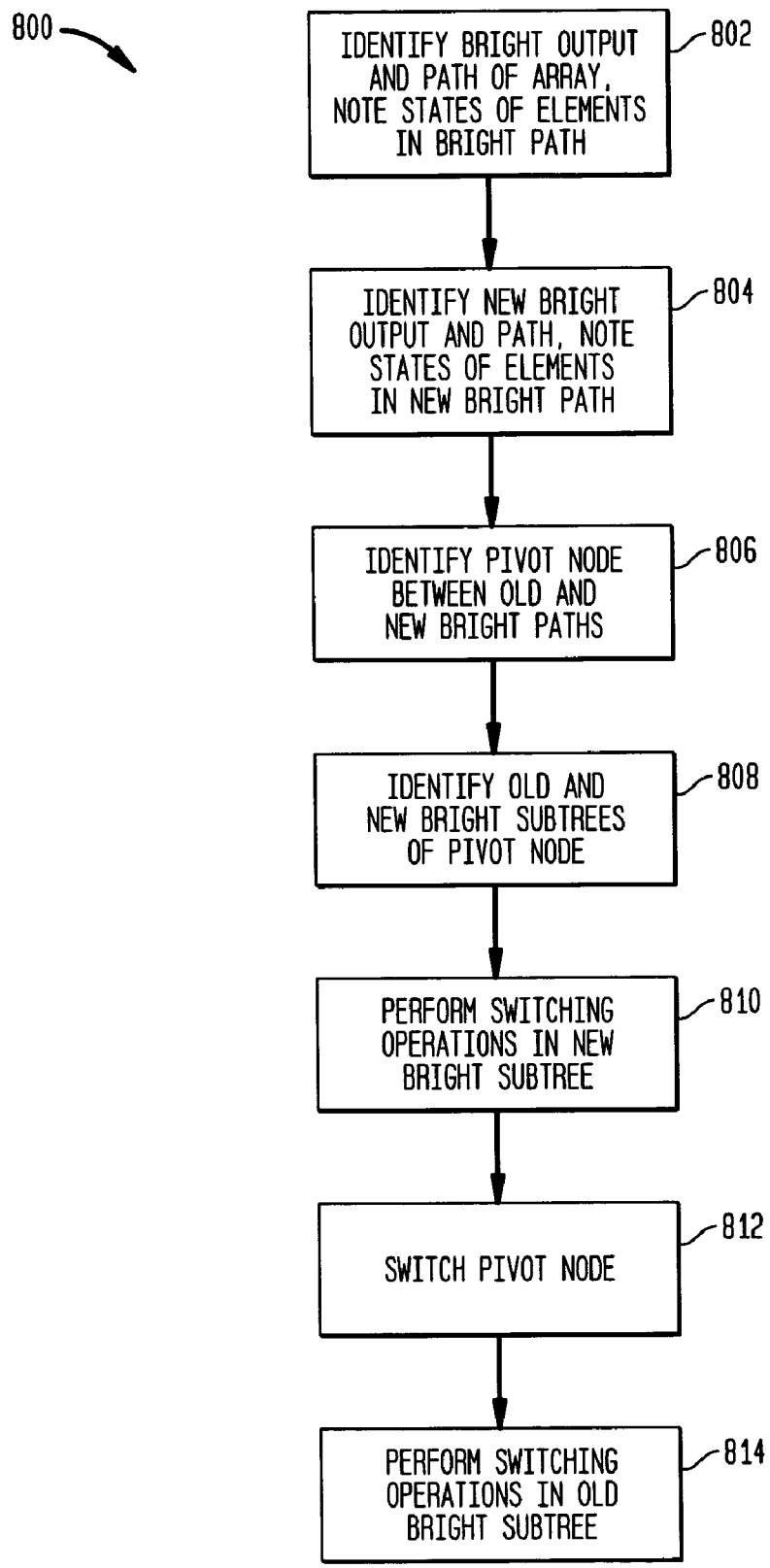
FIG. 8 illustrates a process of switch array control according to an aspect of the present invention.

FIG. 8 illustrates a process 800 of switch array management according to an aspect of the present invention. At step 802, upon receipt of a command to direct a signal to a specified output of a switch array, the array is examined to identify the bright output and path of the array and to note the states of the elements in the bright path. The examination may suitably be performed by examining state information stored in a database, by examining actual array outputs or by performing any of a number of other techniques. At step 804, the new bright output of the array is identified, as well as the new bright path and the present states of elements in the new bright path. At step 806, the pivot node between the old and new bright paths is identified. At step 808, the old and new bright subtrees of the pivot node are identified. At step 810, switching operations are performed in the new bright subtree in order to insure that crosstalk requirements will be met at the outputs in that subtree during and after switching, and that power reduction is achieved insofar as possible. At step 812, the pivot node between the old and new bright subtrees is transitioned so that the signal is routed along the new bright path. At step 814, switching operations are performed in the new dark subtree of the pivot node, in order to reduce power consumption in the new dark subtree of the pivot node. The operations are sequenced so as to follow specified rules for management and reduction of crosstalk.

While the present invention has been disclosed in the context of various aspects of presently preferred embodiments, it will be recognized that the invention may be suitably applied to other environments consistent with the claims which follow.

We claim:

1. A switch array, comprising:
    an arrangement of binary optical switches, the array having an array input and a plurality of array outputs, one of the array outputs carrying a signal originating from an output of one of the switches, the switch array being operative to route an optical signal from the array input to one of the plurality of array outputs, each switch having an optical switch input, a first optical switch output and a second optical switch output, each switch being operative to route an optical signal from the switch input to either the first switch output or the second switch output depending on a state to which the switch is set, each switch having a low power "up" state for routing the signal from a switch input to the first switch output and a high power "down" state for routing the signal from the switch input to the second switch output, the switch emitting, when the switch is in the low power state, a signal substantially equivalent to the signal at the switch input at the first switch output and a highly attenuated signal at the second switch output, and the switch emitting, when the switch is in the high power state, a signal substantially equivalent to the signal at the switch input at the second switch output and a highly attenuated signal at the first switch output; and
    an array controller for managing operations of switches in the array, the array controller being operative to change settings of the switches upon a designation of a new bright output of the array as a destination output so as to change routing of the signal from an original array output to which the signal was originally routed to a new bright output of the array that will be the destination output of the signal after switching is complete, the array controller being operative to sequence switching operations so as to perform a first set of switching operations in a new bright subtree of the array so as to create a signal path along the new bright subtree of the array to the new bright output of the array, to perform a second set of switching operations so as to transition a pivot node between the new bright subtree and an old bright subtree in order to direct the signal along the signal path in the new bright subtree of the array to the new bright output of the array, and to perform a third set of switching operations in the old bright subtree of the array in order to achieve a reduced power consumption in the old bright subtree while meeting predetermined crosstalk limitations.

2. The switch array of claim 1, further comprising a plurality of shutters, each of the shutters having a shutter output forming one of the array outputs, each of the shutters further having a shutter input for receiving a signal from a switch output, each shutter having a high power state in which the shutter input is passed to the shutter output with minimal attenuation, each shutter further having a low power state in which the shutter input is passed to the shutter output after being subjected to attenuation by the shutter, and wherein the array controller is operative to control shutters in the new bright subtree together with switches in the new bright subtree and to control shutters in the old bright subtree together with switches in the old bright subtree, the shutters being controlled in such a way as to achieve reduced power consumption while meeting standards for reduced crosstalk.

3. The switch array of claim 2, wherein each of the switches has a very low power "cold" state, each of the switches being operative to route the signal to its first output when in the very low power state and to emit a signal from the second output that is attenuated but less attenuated than the signal emitted from the second output when the switch is in the low power state.

4. The switch array of claim 3, wherein each of the shutters has a very low power state, each shutter subjecting the shutter input signal to a lesser attenuation when in the very low power state than when in the low power state.

5. The switch array of claim 4, wherein the array controller performs operations so as to insure that all "up" switches in the primary path from the array input to the bright array output are in the low power state, while allowing all switches not in the primary path to be in the very low power state, wherein the array controller further insures that the default shutter in the dark subtree of a switch in the primary path must be in the low power state, while allowing all other shutters besides the shutter providing the bright output to be in the very low power state.

6. The switch array of claim 5, wherein the array controller performs a five step procedure to switch the signal from an old bright output to a new bright output, the first two steps being taken in the old dark subtree, the first step comprising the changing from the very low power state to the low power state of all elements that will need to be in the low power state after switching is completed, the second step comprising the switching from "up" to "down" of all switches in the new primary path that will need to be "down" after switching is completed, the third step being the transitioning of the pivot node between the old and new dark subtrees, the fourth and fifth steps being taken in the new dark subtree, the fourth step being the setting of any "down" switches to "up," the fifth step being the setting of all switches in the low power state to the very low power state other than the default shutter of the pivot node.

7. The array of claim 6, wherein each element of the array is associated with a binary label indicating the path from the input to the element, and wherein the array controller performs binary operations on the labels in order to determine which switching operations are to be executed.

8. The array of claim 7, wherein the array controller comprises an array command interface for receiving instructions indicating the array output to which the signal is to be routed, a binary label processor for examining binary label information and state information in order to determine which switching operations are to be performed, a switch state and mapping information database including state information associating each label with the state of the element indicated by the label, as well as mapping information associating each label with the hardware element indicated by the label, and a switch operation manager for performing the switching operations designated by the binary label processor.

9. A switch array, comprising:

an arrangement of binary optical switches, the array having an array input and a plurality of array outputs, one of the array outputs carrying a signal originating from an output of one of the switches, the switch array being operative to route an optical signal from the array input to one of the plurality of array outputs, each switch having an optical switch input, a first optical switch output and a second optical switch output, each switch being operative to route an optical signal from the switch input to either the first switch output or the second switch output depending on a state to which the switch is set, each switch having a low power "up" state for routing the signal from a switch input to the first switch output and a high power "down" state for routing the signal from the switch input to the second switch output, the switch emitting, when the switch is in the low power state, a signal substantially equivalent to the signal at the switch input at the first switch output and a highly attenuated signal at the second switch output, and the switch emitting, when the switch is in the high power state, a signal substantially equivalent to the signal at the switch input at the second switch output and a highly attenuated signal at the first switch output; and an array controller for managing operations of switches in the array, the array controller being operative to change settings of the switches upon a designation of a new bright output of the array as a destination output so as to change routing of the signal from an original array output to which the signal was originally routed to a new bright output of the array that will be the destination output of the signal after switching is complete, the array controller being operative to set switch states so that as many of the switches as possible are in a low power state after the change of routing is complete, the array controller being operative to sequence operations of the switches so as to minimize the number of switching operations performed in a bright subtree of the array and to maximize the number of switching operations performed in a dark subtree of the array.

10. The switch array of claim 9, wherein the array controller sequences switching operations so that operations are first performed in a new bright subtree of the array that is not yet illuminated, a transition then occurs so that the new bright subtree is illuminated an old bright subtree is no longer illuminated, and switching then occurs in the old bright subtree that is no longer illuminated.

11. The switch array of claim 10, wherein each of the switches has a very low power "cold" state, each of the switches being operative to route the signal to its first output when in the very low power state and to emit a signal from the second output that is attenuated but less attenuated than the signal emitted from the second output when the switch is in the low power state.

* * * * *